United States Patent [19]

Winterhoff et al.

[11] Patent Number: 5,608,189
[45] Date of Patent: Mar. 4, 1997

[54] SCREWABLE INTRODUCTION MEANS FOR SLEEVES OR HOUSINGS

[75] Inventors: Hans Winterhoff, Schwerte; Andreas Guenther, Menden, both of Germany

[73] Assignee: RXS Schrumpftechnik-Garnituren GmbH, Hagen, Germany

[21] Appl. No.: 257,096

[22] Filed: Jun. 7, 1994

[30] Foreign Application Priority Data

Nov. 29, 1993 [DE] Germany .......................... 43 40 629.7

[51] Int. Cl.⁶ ..................................................... H02G 3/18
[52] U.S. Cl. ........................................ 174/65 SS; 285/919
[58] Field of Search ........................ 174/65 SS; 285/905, 285/918, 919, 923

[56] References Cited

U.S. PATENT DOCUMENTS

| | | | |
|---|---|---|---|
| 4,103,911 | 8/1978 | Giebel et al. | |
| 4,301,325 | 11/1981 | Hutchison | 174/76 |
| 4,329,540 | 5/1982 | Howarth | 174/153 R |
| 4,376,873 | 3/1983 | Lackinger | 174/65 SS |
| 4,379,204 | 4/1983 | Perrault et al. | 174/65 SS |
| 4,787,657 | 11/1988 | Henniger | 285/323 |
| 5,208,427 | 5/1993 | Couto et al. | 174/65 SS |

FOREIGN PATENT DOCUMENTS

| | | |
|---|---|---|
| 0402653 | 12/1990 | European Pat. Off. |
| 2583497 | 12/1986 | France . |
| 2309649 | 8/1974 | Germany . |
| 2432420 | 1/1976 | Germany . |
| 3737346 | 12/1988 | Germany . |
| 2040603 | 8/1980 | United Kingdom . |
| 2224894 | 5/1990 | United Kingdom . |

*Primary Examiner*—Laura Thomas
*Assistant Examiner*—Dean A. Reichard
*Attorney, Agent, or Firm*—Hill, Steadman & Simpson

[57] ABSTRACT

A screwable cable seal introduction device for employment at sleeves or housings having an introduction sheath onto which a union nut can be screwed. A press sleeve is located in the inside of the introduction sheath, an annular seal composed of sealing material and laterally arranged support rings being deformed with the press sleeve until the required adhesion of the sealing material at the sealing surfaces to be contacted is accomplished. An automatic pressure compensation subsequently occurs, so that no permanent pressure is exerted onto the introduced cable.

28 Claims, 6 Drawing Sheets

SCREWABLE INTRODUCTION MEANS FOR SLEEVES OR HOUSINGS

BACKGROUND OF THE INVENTION

The invention is directed to a screwable introduction means at introduction openings of sleeves or housings having a pressable annular seal.

Elastic, sheath-like seal elements are employed at screw-type connections between cables or at introduction locations for cables in housings or sleeves, these sheath-like seal elements being tightly pressed in the parting planes due to the pressure arising when screwing the screw elements, such as disclosed in German Published Application 23 09 649. Given such a device, a rigid sheath is additionally inserted under the cable cladding, so that the long lasting pressing power cannot act on the cable leads located in the inside. This measure is required since the introduction location is constantly kept under pressure given such a permanently elastic seal. Difficulties arise given sensitive cables such as, for example, light waveguide cables, in that such a constant pressing can lead to permanent deformation, these difficulties leading to a reduction of the transmission quality of the light waveguides.

SUMMARY OF THE INVENTION

It is than an object of the invention to create a screwable introduction device for pressure-tight introduction of sensitive substrates or cables having a non-rigid or low strength cable cladding structure, whereby no permanent pressure stress should remain after the required sealing effect has occurred. The stated object is then achieved with a screwable introduction device of the type initially set forth in that an introduction sheath having an outside thread is firmly and tightly arranged at the introduction opening of the sleeve or of the housing; in that a union nut having an inside thread can be screwed onto the introduction sheath; in that a compression sleeve is arranged in the union nut having an annular channel formed relative to the inside thread of the union nut, the introduction sheath entering into this annular channel when the union nut is screwed on; in that an annular seal having an inside diameter roughly matched to the cable to be introduced is inserted in the introduction sheath up to an annular stop; and in that the annular end face of the pressing sleeve can be pressed against the end face of the annular seal with the assistance of the union nut.

Advantages over the prior art include the screwable introduction means of the invention being utilized to seal at cables having a sensitive cable structure or at a sensitive substrate without having to maintain a permanent mechanical loading of the cable. A specific sealing compound is introduced into the seal regions of the introduction means and is deformed by appropriate pressing devices until the necessary seal has ensued. The sealing compound is thereby initially placed under pressure by the pressing means and is adhesively pressed onto the parts to be sealed, the cable or substrate cladding and the introduction means, whereby the pressure then gradually relaxes, so that the introduced cable or substrate is no longer under permanent pressure, being damaged as a result thereof. The sealing compound is executed as an annular seal and the basic material thereof is composed of butyl compounds that are modified in a suitable way. The sealing effect is essentially based on the adhesion of the sealing compound to the surfaces of the elements to be sealed, so that permanent pressure is no longer required after the deformation or, respectively, forming.

For example, the following come into consideration as sealing compounds: permanently plastic sealing compound, plastic and elastic sealing compound, initially plastic sealing compounds that harden over time, gel-like sealing compound, and gel-like, hardenable sealing compounds.

Various embodiments can be selected for the shape of the sealing compound, whereby these are preferably fashioned as complete structural parts; however, it is also possible to produce the seal in the form of a wound tape on the substrate to be introduced. However, the following exemplary embodiments are especially expedient: an annular structural part, a structural part having stabilizers, a structural part having supporting elements, a structural part having supporting elements and tension intercept at the cable cladding, a divided structural part, a divided structural part having mutual connection, for example with the assistance of a hinge, a divided structural part having joining elements, a divided structural part having glide elements at the end faces as a seat for pressure elements, or a casting compound having seal rings at the end faces.

The introduction device of the invention can be employed both at cut as well as uncut cables or substrates. Divisible threaded joints are utilized given uncut elements. For malfunctioning threaded joint elements, divided threaded joint elements can likewise be employed for repair purposes. For example, these divided threaded joint elements can also comprise appropriate joining elements with which the individual parts of the joint elements can be held together. The coupling can be undertaken with joining elements in longitudinal direction as well as in axial direction, whereby the joining technique is to be respectively correspondingly fashioned. It is thereby Advantageous when the individual joining parts comprise guides or safety devices to prevent them from coming apart. Assembly is significantly facilitated as a result thereof, since the individual parts are fixed to one another. For example, the following come into consideration as such guides: a channel and spring systems, for example in dovetail form, pins and corresponding bores, a prism guide, or a flat guide with wrap-around strip.

The invention shall now be set forth in greater detail with reference to nineteen figures.

DETAILED DESCRIPTION OF THE PREFERRED EMBODIMENTS

Figure 1:
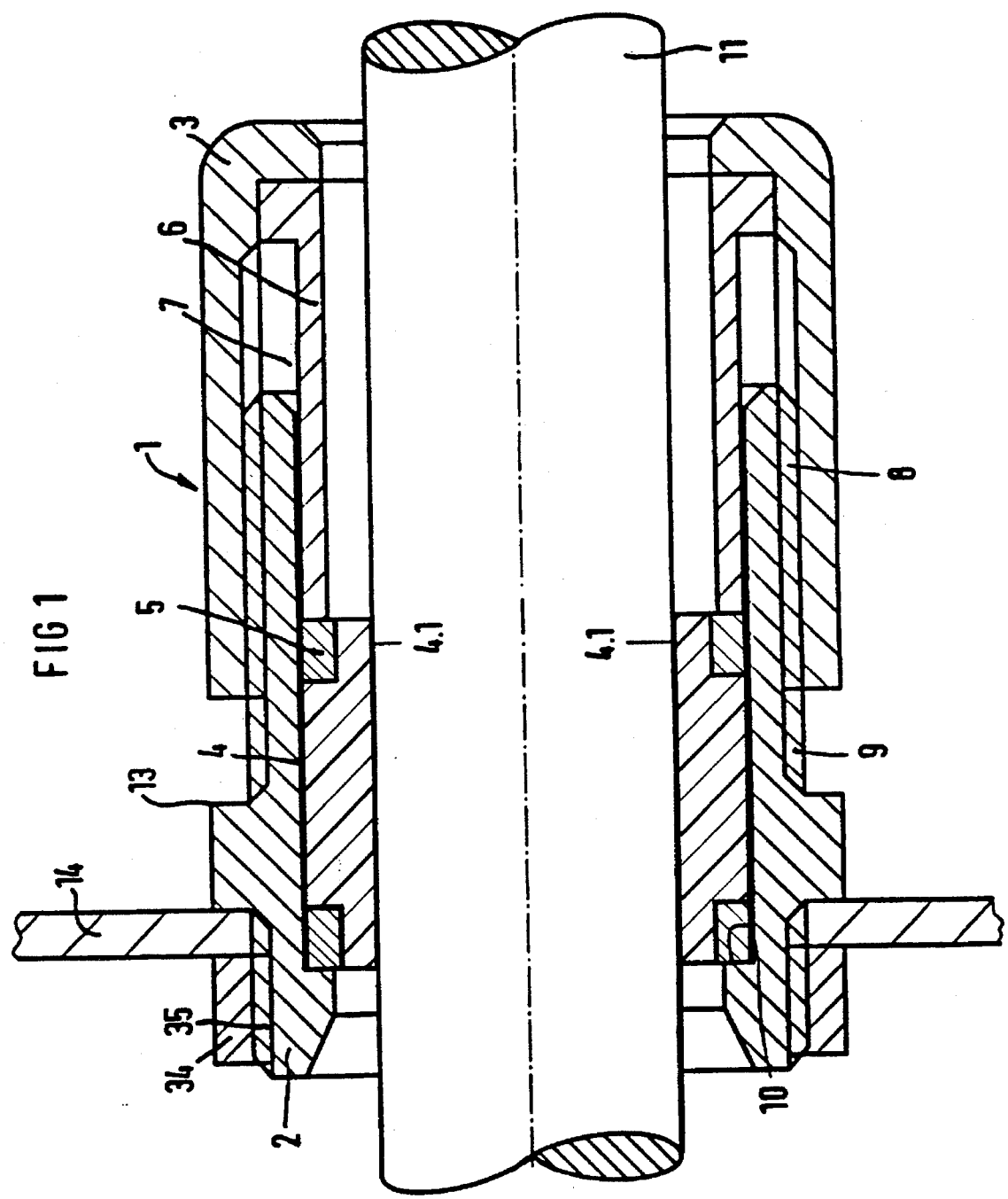
FIG. 1 is a sectional view of a first, completely assembled embodiment of the introduction device.

FIG. 1 illustrates an introduction device 1 of the invention mounted screwable in an introduction opening of a housing 14 or of a sleeve. The basic element, the introduction sheath 2, is firmly and tightly introduced in the introduction opening of the housing 14, whereby the introduction sheath 2 is provided with a hexagon flange 13 at the seating side and is screwed against the housing wall 14 on the outside thread 35 with an underlying nut 34. The introduction sheath 2 is executed with specific sealing lips on the seating surface to the housing 14. The free, outwardly directed end of the introduction sheath 2 carries an outside thread 9 on which a union nut 3 can be screwed. A press sleeve 6 is introduced such in this union nut 3 with inside thread 8 that a channel 7 into which the free end of the introduction sheath 2 enters when the union nut 3 is screwed on is formed between the inside thread 8 and the press sleeve 6.

An annular seal 4 whose inside diameter roughly corresponds to the diameter of the introduced cable 11 is introduced in the inside of the introduction sheath 2 for the seal relative to the introduced cable 11. At the inner end, the annular seal 4 has an end-face washer or annular support ring 5 supported against an inside stop 10 of the introduction sheath 2. When the union nut 3 is screwed on, the press sleeve 6 is then pressed against a second support ring 5 of the annular seal 4, whereby the annular seal 4 is then compressed such that the sealing compound of the annular seal 4 is adhesively applied against the cable 11 and against the inside wall of the introduction sheath 2. The pressing can be discontinued after this application of the sealing compound, since further sealing ensues due to the adhesion of the sealing compound at the contacted surfaces. A pressure compensation gradually ensues, so that the cable 11 is ultimately no longer pressure-loaded. The pressure compensation of the sealing compound thereby ensues in longitudinal direction along the cable cladding surface in the edge regions 4.1 of the sealing compound. The end-face support rings 5 effect a uniform pressing of the sealing compound in the pressing phase.

Figure 2:
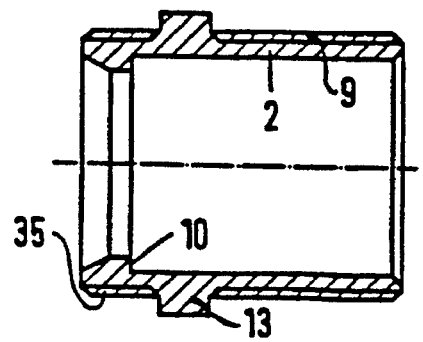
FIG. 2 is a sectional view of an introduction sheath.

FIG. 2 illustrates the fashioning of the introduction sheath 2 in a sectional view, whereby the hexagon flange 13 at the outer circumference, the stop 10 for the annular seal, the outside thread 9 and the outside thread 35 for screwing the fastening nut are shown.

Figure 3:
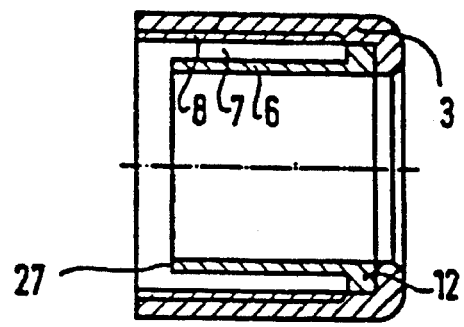
FIG. 3 is a sectional view of a nut with press sleeve.

The coupling of the union nut 3 and the inner press sleeve 6 is shown in FIG. 3, and the annular channel 7 is shown into which the introduction sheath 2 enters when the entire introduction device is assembled. The inside thread 8 thereby engages into the outside thread 9 of the introduction sheath 2 shown in FIG. 2. The annular end face 27 of the press sleeve 6 serves as stop for the annular support ring 5 (or 15 described below).

Figure 4:
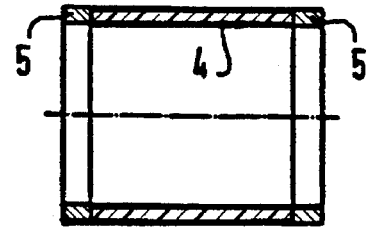
FIG. 4 is a sectional view of a first annular seal.

FIG. 4 illustrates a simple annular seal 4 of the invention whose middle region is composed of the sealing compound already set forth above and which has both end faces limited with annular support rings 5.

Figure 5:
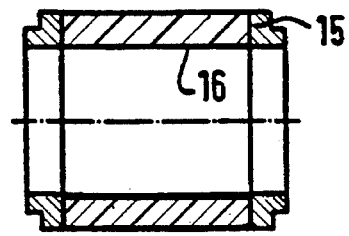
FIG. 5 is a sectional view of a second annular seal.

FIG. 5 shows a further annular seal 16 that has both end faces provided with offset, annular support rings 15. Due to this offset of the support rings 15 at the outer end faces, a better guidance and centering of the annular seal is established inside the introduction sheath 2 and for the press sleeve 6 to be screwed. Otherwise, the conditions are the same.

Figure 6:
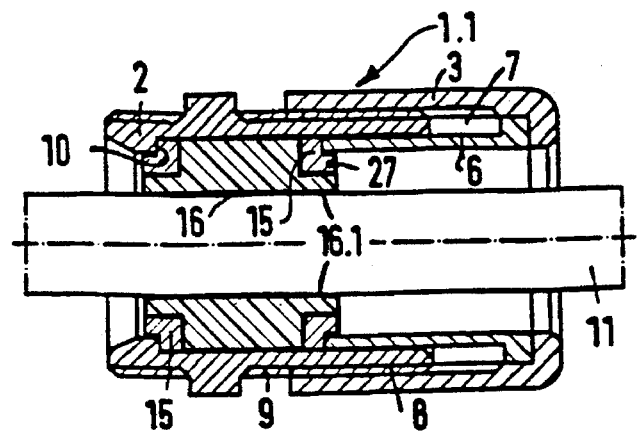
FIG. 6 is a sectional view of a second, completely assembled embodiment of the introduction device.

FIG. 6 shows an exemplary embodiment of an introduction device 1.1 of the invention having an annular seal 16 of FIG. 5. It becomes especially clear here that a good guidance in the overall arrangement is achieved by the offset of the end faces of the support rings 15 since a central alignment during assembly can thereby be achieved; namely, the projections 10 of the introduction sheath 2 and/or the end face 27 of the press sleeve 6 engage into the offset regions of the support rings 15. Otherwise, the conditions are the same as those in the exemplary embodiment of FIG. 1.

Figure 7:
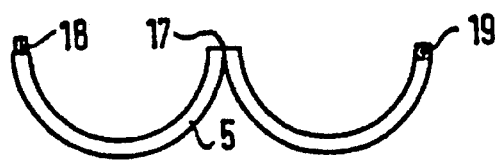
FIG. 7 is an end view of a divided form of a support ring or, respectively, annular seal with film hinge.

FIG. 7 shows that the support rings 5 and the annular seal as well can be executed longitudinally divided overall, so that employment at uncut substrates cables is also possible. In this case, a film hinge 17 via which the halves of the parts can be hinge apart or together facilitates the assembly. The open side is then held together by appropriate joining or catch elements after the halves are positioned together. In this case, pins 18 and corresponding bores 19 are provided on opposite longitudinal edges.

Figure 8:
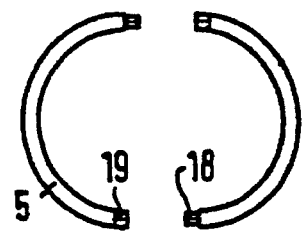
FIG. 8 is an end view of a divided form of the support ring or, respectively, annular seal with joining technique.

FIG. 8 shows that the annular seal with support ring 5 can also be completely divided, so that corresponding joining or catch elements 18, 19 are introduced at both sides for the necessary fixing.

Figure 9:
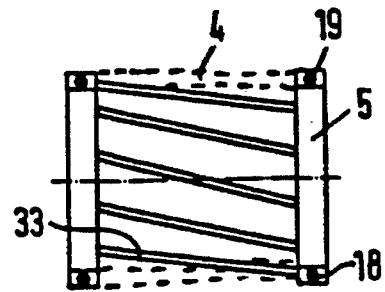
FIGS. 9–13 are elevational views of divided show annular seals having stabilizers embedded therein.

It proceeds from FIG. 9 that support elements 33 are injected as one part together with the support rings 5 and are surrounded by the sealing compound 4 which is shown dashed. The situation is the same in the following FIGS. 10–13 with the support elements 28–32. These support elements are, respectively, stabilizers 32, and as in the case of the following FIGS. 10–13, must allow a deformation of the sealing compound in axial direction but, on the other hand, form a reinforcement of the annular seal overall and can even serve as intercept elements for the cable cladding given an appropriate design. By pressing the annular seal together during assembly, the support elements 32 (as well as 28, 29, 30, 31) are pressed together and consequently grasp the cable cladding more tightly, so that better mechanical contact to the cable cladding can also be achieved via these support elements. These support elements or, respectively, stabilizers can thus also serve as tension intercepting elements for tensile forces acting on the cable cladding.

For the sake of clarity, divided annular seals are shown in FIGS. 9–13, pins 18 and bores 19, for example, being provided as catch elements at a parting plane. The support elements, stabilizers or, respectively, intercept elements are essentially stable bands or wire-shaped elements that extend from one support ring 5 or 15 to the other support ring 5 or 15.

Figure 10:
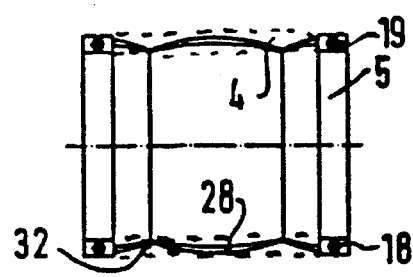

FIG. 10 shows an annular seal of sealing compound 4 with inserted support elements or, respectively, stabilizers 28 that are arcuately conducted in longitudinal direction, whereby they are buckled at a number of places as rated buckle points 32. When pressing the annular seal in axial direction, these support elements 28 then buckle inward and then act on the cable cladding as intercept elements. Wire-shaped support elements 28 are employed.

Figure 11:
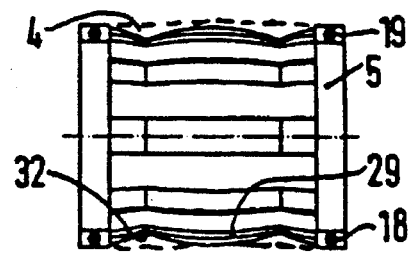

FIG. 11 shows a similar embodiment as FIG. 10, however, band-shaped support elements 29 are employed.

Figure 12:
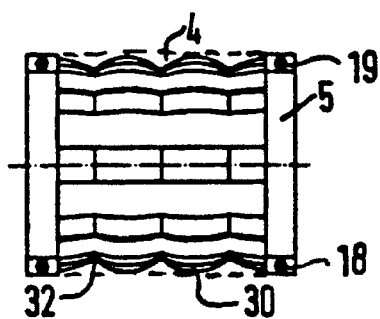

FIG. 12 illustrates an embodiment wherein the support elements 30 comprise a plurality of rated buckle points 32 lying behind one another.

Figure 13:
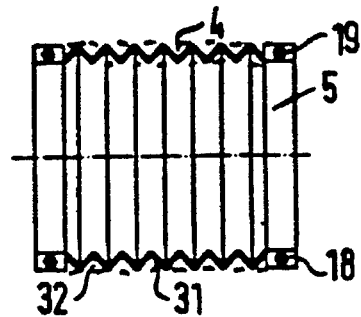

FIG. 13 shows that a corrugated pipe 31 can also be employed as support element, this being embedded into the sealing compound 4. When the annular seal is axially pressed, a constriction of the inside diameter also ensues here, so that conditions similar to those already set forth above are established here.

Figure 14:
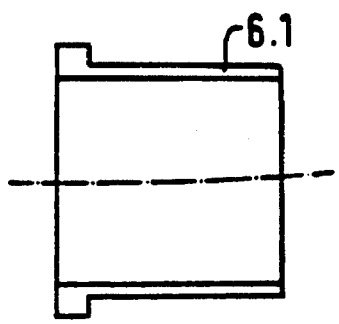
FIG. 14 is a sectional view of a divided press sleeve.

FIG. 14 shows a divided press sleeve 6.1 that is suitable for use at uncut substrates or cables.

Figure 15:
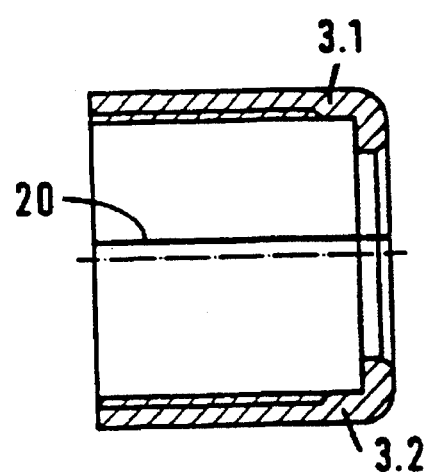
FIG. 15 is a sectional view of a divided union nut.

FIG. 15 shows a union nut divided into two halves 3.1–3.2, whereby the longitudinal division 20 may be seen.

Figure 16:
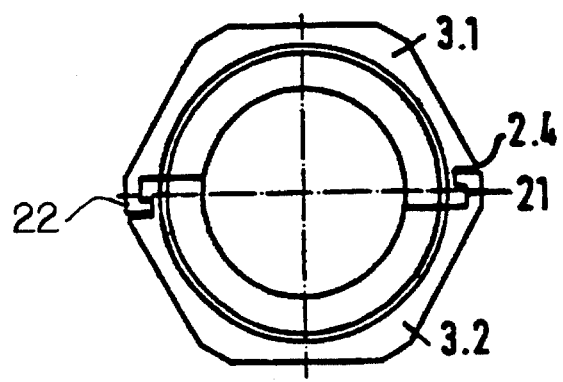
FIG. 16 is an end view of a longitudinally divided introduction device having a first joining technique.

FIG. 16 illustrates a divided execution of the union nut 3 having two halves 3.1, 3.2. Joining profiles 21, 22 are fashioned here along the longitudinal division 20, a radial joining of the halves of the part being possible therewith. Due to the channel-like fashioning of the longitudinal edge regions, the halves are fixed against one another after the radial joining.

Figure 17:
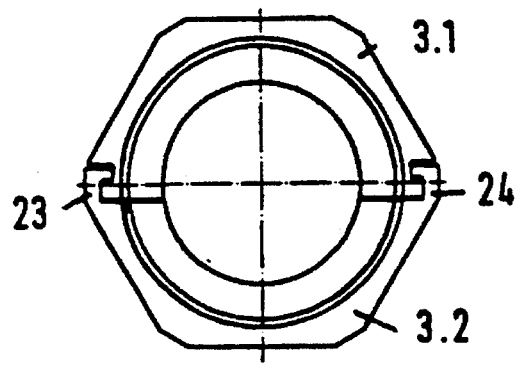
FIG. 17 is an end view of a longitudinally divided introduction device having a second joining technique.

FIG. 17 illustrates a fashioning of the longitudinally proceeding division regions having channels and edge profiles 23 and 24 with which a joining only in longitudinal direction can ensue. These channels can comprise a rectangular cross-section or, for example, a dovetail-like cross-section as well. Prism guides for flat joints having wrap-around strips can likewise be applied. What all embodiments share, however, is that they offer protection against disengagement.

Figure 18:
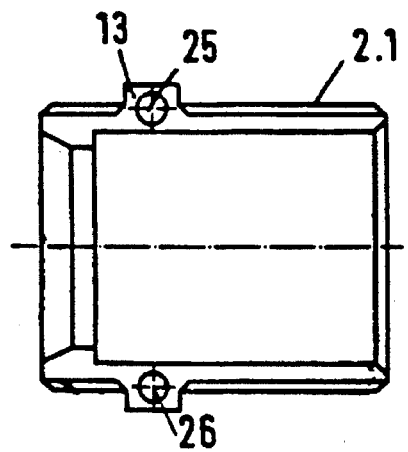
FIG. 18 is a sectional view of a divided introduction sheath.

FIG. 18 shows a halved introduction sheath 2.1 that comprises suitable joining or, respectively, catch elements 25 and 26 in the regions of the flange 13.

Figure 19:
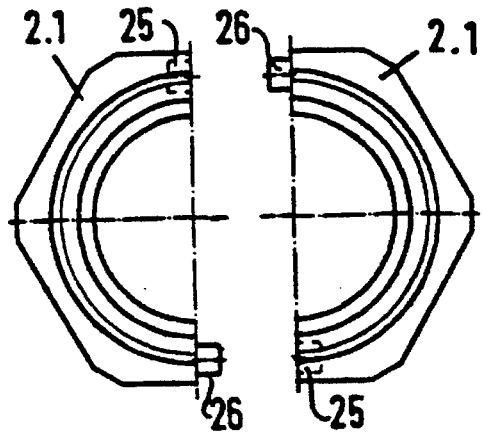
FIG. 19 is an exploded end view of a joining technique for introduction sheaths.

FIG. 19 illustrates the embodiment of FIG. 18 and shows that pins 26 and bores 25 are applied as joining elements.

Moreover, the recited possibilities of the joining techniques can be modified or varied as desired. It is thereby important that protection against unintentional disengagement is established after assembly.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A screwable introduction device at an introduction opening of a component having a pressable annular seal comprising:

an introduction sheath having outside threads adapted to be firmly and tightly arranged at the introduction opening of the component, and having an inside annular stop;

a union nut having an inside thread screwed onto the introduction sheath outside threads;

a press sleeve having an annular end face arranged inside the union nut, an annular channel formed between the press sleeve and the inside thread of the union nut, the introduction sheath entering into said annular channel when the union nut is screwed on;

an annular seal having a front face and an end face and an inside diameter roughly matched to a cable to be introduced into the introduction sheath, said front face abutting said annular stop;

the annular end face of the press sleeve pressed against the end face of the annular seal with the assistance of the union nut; and wherein the annular seal, introduction sheath, union nut, and the press sleeve are each divided longitudinally forming respective longitudinally extending opposed and separable edges.

2. A screwable introduction device according to claim 1, further comprising a nut, and wherein the introduction sheath comprises a hexagon flange at an outer circumference; and wherein the introduction sheath has further outside threads and is tightly and firmly screwed against a wall of the component with said nut threaded on said further outside threads and arranged on an opposite side of said wall from said hexagonal flange.

3. A screwable introduction device according to claim 1, wherein the annular seal is arranged between two annular support rings.

4. A screwable introduction device according to claim 1, wherein the annular seal is composed of permanently plastic sealing compound.

5. A screwable introduction device according to claim 1, wherein the annular seal is composed of plastic-elastic sealing compound.

6. A screwable introduction device according to claim 1, wherein the annular seal is composed of a sealing compound that is plastic at the time of assembly and hardens over time.

7. A screwable introduction device according to claim 1, wherein the annular seal is composed of a gel-like sealing compound.

8. A screwable introduction device according to claim 1, wherein the annular seal is composed of a sealing compound that is gel-like at the time of assembly and hardens over time.

9. A screwable introduction device according to claim 1, wherein the annular seal is composed of a casting compound having lateral seal rings.

10. A screwable introduction device according to claim 1, wherein the annular seal is fashioned as a continuous tape and is wound onto the cable to be sealed.

11. A screwable introduction device according to claim 1, further comprising two support rings and wherein the annular seal and said two support rings, one on each axial end, are fashioned as an independent structural part.

12. A screwable introduction device according to claim 1, wherein the annular seal contains mechanical support elements for gripping a cable cladding inserted therein.

13. A screwable introduction device according to claim 1, wherein the annular seal is provided with a tension intercepter means for mechanically gripping a cable cladding inserted therein and resisting a tension force on said cable cladding.

14. A screwable introduction device according to claim 3, wherein the support rings are longitudinally divided forming respective longitudinally extending opposed and separable edges.

15. A screwable introduction device according to claim 3, wherein the support rings are each formed from two halves which are each semicircular in cross section, said halves being hingeably joined to one another at a hinge.

16. A screwable introduction device according to claim 1, wherein said introduction sheath, and the union nut are provided with joining profiles along the respective opposed separable edges of the union nut and the press sleeve that mutually engage together.

17. A screwable introduction device according to claim 16, wherein a joining direction of said joining profiles is radial.

18. A screwable introduction device according to claim 16, wherein a joining direction of said joining profiles proceeds longitudinally.

19. A screwable introduction device according to claim 17, wherein each of the union nut and the press sleeve are provided with an interlock arranged to prevent disengagement of the union nut and the press sleeve along the respective opposed separable edges of the union nut and the press sleeve.

20. A screwable introduction device according to claim 16, wherein the joining profile along the respective separable edges of one of the union nut and introduction sheath is fashioned in dovetail form.

21. A screwable introduction device according to claim 16, wherein the joining profile along the respective separable edges of one of the union nut and introduction sheath is composed of pins and bores.

22. A screwable introduction device according to claim 16, wherein the joining profile along the respective separable edges of one of the union nut and introduction sheath is fashioned as a prism guide.

23. A screwable introduction device according to claim 16, wherein the joining profile along the respective separable edges of one of the union nut and introduction sheath is fashioned as a flat guide with wraparound strip.

24. A screwable introduction device according to claim 13, wherein the tension interceptor means is arranged in the region of the annular seal and is fashioned as intercept elements that can be radially inwardly pressed against the cable claddings upon active pressing of the annular seal in longitudinal direction.

25. A screwable introduction device according to claim 24, wherein the tension intercept elements comprise circumferentially arranged arcuate bands having all around, sharp-edged buckling points between bands.

26. A screwable introduction device according to claim 24, wherein the tension intercept elements comprise longitudinally arranged bands having intermittently spaced, sharp-edged buckling points.

27. A screwable introduction device according to claim 1, wherein said press sleeve is provided with joining profiles along the respective opposed separable edges of the press sleeve that mutually engage together.

28. A screwable introduction device according to claim 27, wherein the introduction sheath and the union nut are provided with joining profiles along the respective opposed separable edges of the introduction sheath and union nut that mutually engage together.

* * * * *